United States Patent
Jensen et al.

(10) Patent No.: US 11,285,412 B2
(45) Date of Patent: Mar. 29, 2022

(54) METHOD AND SYSTEM FOR CLEANING DEGRADED OIL

(75) Inventors: Søren Hallberg Jensen, Copenhagen (DK); Henrik Hallberg Jensen, Valldoreix (ES)

(73) Assignee: C.C JENSEN A/S, Svendborg (DK)

( * ) Notice: Subject to any disclaimer, the term of this patent is extended or adjusted under 35 U.S.C. 154(b) by 55 days.

(21) Appl. No.: 14/371,058

(22) PCT Filed: Jan. 10, 2012

(86) PCT No.: PCT/DK2012/050012
§ 371 (c)(1),
(2), (4) Date: Jul. 8, 2014

(87) PCT Pub. No.: WO2013/104361
PCT Pub. Date: Jul. 18, 2013

(65) Prior Publication Data
US 2015/0014254 A1    Jan. 15, 2015

(51) Int. Cl.
*B01D 35/18* (2006.01)
*B01D 29/00* (2006.01)
(Continued)

(52) U.S. Cl.
CPC .............. *B01D 35/18* (2013.01); *B01D 29/00* (2013.01); *B01D 35/1573* (2013.01); *F16N 39/00* (2013.01)

(58) Field of Classification Search
CPC .... B01D 35/1573; B01D 35/18; B01D 29/00; F16N 39/00; A63C 11/08; B32B 2391/00; C10G 73/32; C10G 73/06; C10G 21/14; C10G 2300/201; C10G 2300/302; C10G 2400/10; C10G 1/002; C10G 1/02;
(Continued)

(56) References Cited

U.S. PATENT DOCUMENTS 2,463,845 A  *  3/1949  Backlund ............... C10G 73/06
                                                        208/31
2,654,692 A  *  10/1953  Kiersted, Jr. ......... C10G 73/06
                                                        208/31
(Continued)

FOREIGN PATENT DOCUMENTS

CN          1132073 A        9/1982
CN          2565517 Y        8/2003
(Continued)

OTHER PUBLICATIONS

Tomoyuki, Dec. 20, 2007, Machine Translation, pp. 1-20.*

*Primary Examiner* — Bobby Ramdhanie
*Assistant Examiner* — Donovan Bui-Huynh
(74) *Attorney, Agent, or Firm* — Noréns Patentbyrå Ab; Fredrik Möllborn

(57) ABSTRACT

A Method for cleaning degraded oil comprising oil-soluble degradation products and a system for implementing the method are disclosed. The method comprises the steps of receiving an inlet flow (1, 1a, 1b) of degraded oil, precipitating oil-soluble degradation products from the degraded oil by cooling the degraded oil, passing the cooled degraded oil as a filtration flow (3, 3a, 3b) through a filter (104, 204, 304) so as to retain the precipitated degradation products in the filter, and discharging an outlet flow (2, 2a, 2b) of cleaned oil.

18 Claims, 2 Drawing Sheets

(51) Int. Cl.
*F16N 39/00* (2006.01)
*B01D 35/157* (2006.01)

(58) Field of Classification Search
CPC ........ C10G 1/045; C10G 21/00; C10G 21/06;
C10G 21/12; C10G 21/22; C10G 21/27;
C10G 21/28; C10G 2300/1007; C10G
2300/207; C10G 2300/301; C10G
2300/308; C10G 2300/4006; C10G
2300/4012; C10G 2300/42; C10G
2300/807; C10G 2400/02; C10G 25/003;
C10G 25/12; C10G 31/00; C10G 53/04;
C10G 65/10; C10G 67/04; C10G 67/14;
C10G 73/22; C10G 73/42; C08K 5/053;
C02F 1/04; C02F 9/04; C02F 1/44; C02F
9/00; C02F 1/048
See application file for complete search history.

(56) References Cited

U.S. PATENT DOCUMENTS

| | | | | |
|---|---|---|---|---|
| 2,748,056 A | * | 5/1956 | Backlund | C10G 73/06 208/31 |
| 2,798,028 A | * | 7/1957 | Perry | C10G 73/42 208/26 |
| 3,067,125 A | * | 12/1962 | Kemp | C10G 73/06 208/31 |
| 3,130,143 A | * | 4/1964 | Salmon | C10G 73/06 203/79 |
| 3,159,563 A | * | 12/1964 | Anastasoff | C10G 73/06 196/14.5 |
| 3,503,870 A | * | 3/1970 | Walker | C10G 21/00 208/33 |
| 3,554,898 A | * | 1/1971 | Wood et al. | C10G 65/10 208/108 |
| 4,145,275 A | * | 3/1979 | Hall | C10G 73/06 208/33 |
| 4,199,433 A | | 4/1980 | Button et al. | |
| 5,358,625 A | * | 10/1994 | Gould | B01D 61/02 208/31 |
| 5,360,530 A | * | 11/1994 | Gould | C10G 73/06 208/31 |
| 5,620,588 A | | 4/1997 | Ackerson et al. | |
| 8,061,739 B2 | * | 11/2011 | Marchal | E21B 17/042 285/123.1 |
| 2003/0080036 A1 | * | 5/2003 | Nguyen | B01D 35/147 210/185 |
| 2003/0150783 A1 | * | 8/2003 | Roesgen | B01D 29/608 210/97 |

FOREIGN PATENT DOCUMENTS

| | | |
|---|---|---|
| CN | 101871391 A | 10/2010 |
| JP | S55123687 A | 9/1980 |
| JP | 9-256979 A | 9/1997 |
| JP | 10-316993 A | 12/1998 |
| JP | 2005048665 A | 2/2005 |
| JP | 2007327359 A * | 12/2007 |
| WO | 9639474 A1 | 12/1996 |

* cited by examiner

METHOD AND SYSTEM FOR CLEANING DEGRADED OIL

This is a National Phase Application filed under 35 U.S.C. 371 as a national stage of PCT/DK2012/050012, filed Jan. 10, 2012, the content of each of which is hereby incorporated by reference in its entirety.

TECHNICAL FIELD

The invention relates to a method for cleaning degraded oil comprising oil-soluble degradation products. According to a further aspect, the invention relates to a system for cleaning degraded oil comprising oil-soluble degradation products.

BACKGROUND

Oil is used as a functional liquid in many large-scale industrial and manufacturing facilities. Examples for such functions may comprise lubrication, hydraulics, use as a quenching fluid in steel production, or other. Numerous degradation and contamination processes affect the lifetime of the oil, as well as the operation, the maintenance and ultimately the lifetime of the machinery using the oil. Cleaning and changing the oil in a large facility, is therefore of the utmost importance. However, such maintenance of the oil systems of a given facility can involve considerable costs both in view of the cost for large amounts of high performance oil and, typically even more important, costs resulting from any down-time of the facility.

The use imposes a substantial stress to the oil and leads to wear and degradation of the oil, e.g. due to oxidation of the oil under thermal stress. A primary source of degradation is oxidation of the oil, in addition to thermal and mechanical stress, and subsequently further oxidation of such degradation products. Furthermore, the degradation products may react with each other and/or polymerise. The degradation processes thereby form varnish precursors, as well as components causing miscolouring and a change in smell of the used oil as compared to fresh oil. As a consequence, the degraded oil is typically a complex solution comprising numerous different oil-soluble contaminants generated by the degradation of the oil in use. The degradation/oxidation products thus contaminate the oil, thereby affecting the performance of the oil. Polymers formed may cause varnish depositing on surfaces throughout the oil system of the facility, thereby affecting the performance of the facility, causing down-time for maintenance, reducing the lifetime of central parts of the facility, or even catastrophic failure of the facility.

In order to extend the lifetime of the oil and increase the service intervals requiring down-time of the facility, it is desirable to remove the contaminants from the oil during operation of the facility, before they irreversible deteriorate the components of the facility. However, the degradation/oxidation products are often difficult to remove, because they are in solution in the oil. Known methods for removing oxidation products from oil usually require downtime, are complex and involve considerable investments, or are simply not efficient enough.

DISCLOSURE OF THE INVENTION

It is therefore desirable to provide a method and a system that efficiently can reduce the concentration of oil-soluble degradation/oxidation products from oil, which is suited for being operatively connected to the oil-system of a large installation under operation, preferably without having to shut down the respective components of the installation under service.

According to one aspect, object of the present invention is therefore to provide a method for cleaning used oil overcoming the problems of the prior art or at least producing an alternative. According to a further aspect, it is an object of the present invention to provide a system implementing the above method for cleaning oil that has been degraded by use.

The object of the present invention is achieved by a method and/or a system for cleaning degraded oil according to independent claim 1 and claim 12, respectively. Advantageous embodiments are defined by the dependent claims.

According to one embodiment, a method for cleaning degraded oil comprising oil-soluble degradation products comprises the steps of receiving an inlet flow of degraded oil, precipitating oil-soluble degradation products from the degraded oil by cooling the degraded oil to a precipitation regime and by keeping the degraded oil in the precipitation regime for a dwell-time, passing the cooled degraded oil as a filtration flow through a filter so as to retain the precipitated degradation products in the filter, and discharging an outlet flow of cleaned oil.

One of the insights underlying the present invention is to recognise that precipitation by cooling allows for an efficient separation of the oil-soluble degradation products from the carrier oil. It is recognised that to a large degree the solubility of the degradation products encountered in used oil decreases with decreasing temperature in such a way that these degradation products may efficiently be precipitated from solution by appropriate cooling, yet operating the method in a flow-through manner.

The term "oil-soluble" refers to a solvent-solute system where the oil acts as the solvent and the degradation products are the solute. The degradation products contaminate the oil with the above-mentioned consequences for performance, service, maintenance, and life-time of the set-up of a machinery/installation/facility where the oil is used. "Cleaning" the oil in the context of the present application refers to the process of reducing the concentration of oil-soluble contaminants/degradation products dissolved in the oil. Accordingly, "cleaned oil" means oil with a reduced contamination level, i.e. a reduced concentration of oil-soluble contaminants/degradation products, as compared to the contamination level of the "degraded oil". A level of degradation of oil may be related to the contamination level of the oil and may be determined, e.g. by measuring the Membrane Patch Colorimetric (MPC) value of a sample of the oil in question. The MPC value may be measured using a standardized and calibrated procedure as implemented by commonly available instrumentation, such as the FLUITEC i-LAB 475 spectrophotometer. The scale of the MPC value ranges from 0-100. A contamination level with an MPC value of above about 20 is usually considered a high level of oil contamination, and a contamination level with an MPC value of above 30 is usually considered critical for most applications, in particular in large facilities. It should be noted, that oil degradation is a complex process involving e.g. oxidation, hydrolysis and thermal degradation processes, and resulting in a large variety of degradation products, such as aldehydes, ketones and carboxylic acid. Metals, such as iron or copper may act as catalysts to the processes involved in degradation. The composition of the degraded oil may therefore depend on the particular oil and additives contained in the oil, conditions of use in the particular set-up, and the degradation processes at play. It is therefore difficult to provide a universal calibration of any such measurement. Nevertheless, a number of different analytical methods for monitoring oil degradation exist. The same analytical methods may be used for monitoring any cleaning process and its performance in a given set-up, thereby determining any deviations/changes/trends in the measurement result over time and/or between input and output of the cleaning process. Examples for such analytical methods for monitoring degradation of oil are measurements of total acid number (TAN), viscosity, ultra centrifuge, infrared spectroscopy, remaining useful life evaluation routine (RULER), the above mentioned membrane patch colorimetry (MPC) test, quantitative spectrophotometric analysis (QSA), and rotary pressure vessel oxidation test (RPVOT). The information obtained from the different analytical methods may be supplementary to each other. Advantageously, the different methods may therefore be used in combination.

Precipitation by cooling has the advantage that cooling can be applied from the outside and does not require, e.g. the introduction of contamination-specific solvents into the oil. Furthermore, the method is as mentioned, suited for operation in a flow-through manner. The method can therefore be applied in a continuous manner operatively coupled to the oil system of a given set-up of a machinery/industrial installation/facility in operation. It is recognised by the present invention that degradation products due to normal use of oil in many set-ups are often generated at a relatively slow rate and that the present method is well suited and may advantageously be configured for use in a low flow-rate design for continuous maintenance of the oil. Cleaning the oil continuously using the method according to the present invention has the advantage that it efficiently keeps the oil clean by retaining degradation products at an early stage essentially as they are generated, thereby preventing the formation of derivative contaminants.

The precipitation by cooling is stimulated upstream of a filter. By precipitating the oil-soluble contaminants upstream of the filter, the precipitates may be caught by the filter material and retained therein. Whereas the thermodynamic equilibrium determines the total amount of degradation products precipitating from the degraded oil after a given change in temperature, the kinetics determines the rate of the precipitation process. Precipitation is initiated by cooling the degraded oil into the precipitation regime, and subsequently the precipitates are formed and aged by keeping the degraded oil at temperatures in the precipitation regime for a dwell-time. The dwell time is thus to be understood as the time during which the flow of degraded oil is kept at temperatures in the precipitation regime after the point where the degraded oil was cooled down to temperatures in the precipitation regime. During that dwell-time the precipitates are aged to a stage where they may be retained in the filter medium. Typically, the flow of degraded oil is kept at temperatures in the precipitation regime at least from the point where cooling is applied to the inlet flow of degraded oil, from the cooling point to the filter, and in the filter itself. In addition, interaction of the cold degraded oil with the filter medium and with precipitates already retained therein, such as adsorption/absorption/coalescence, may further promote the formation of precipitates and improve the retaining efficiency of the filter. Furthermore, by passing the degraded oil in a cooled state through the filter, the oil will not tend to pick up contamination by dissolving degradation products already retained by the filter material.

The speed at which equilibrium is reached (as determined by the kinetics) is in the case of precipitation of degradation products from degraded oil favoured by quick changes in temperature and accelerated by small amount of impurities in the oil that act as seeds for polymerisation/crystallisation. The precipitation process may therefore be accelerated by applying the cooling suddenly, e.g. as a shock cooling of the degraded oil as compared to a slow cooling process.

In a typical set-up, the dwell-time is preferably in the range of minutes, such as at least 1 min, 5 min, 10 min, 15 min, 20 min, 25 min, 30 min, or in the range of hours, such as up to or about ½ hour, 1 hour, 2 hours, 3 hours, 4 hours, 5 hours, 6 hours, 7 hours, 8 hours, 9 hours, 10 hours, 11 hours or even 12 hours.

As mentioned above, degraded oil is a complex fluid comprising numerous different degradation products dissolved in the oil. For each of the different degradation products, the onset of precipitation may occur at a slightly different temperature, and the onset of precipitate formation in the cooled degraded oil may be observed to be spread over a temperature range. Nevertheless, three temperature ranges may be distinguished. At high temperatures a solution regime exists where essentially all degradation products are in solution. At low temperatures a precipitation regime exists where essentially all degradation products that are to be removed from the oil form precipitate. At intermediate temperatures between the solution regime and the precipitation regime a transition regime exists where a first fraction of degradation products to be removed does not yet form precipitates, whereas a second fraction of degradation products to be removed already forms precipitates.

The method may be implemented in a system for cleaning degraded oil (i.e. an oil cleaning system) in a given set-up of machinery or industrial installation. The method may thus comprise receiving an inlet flow of degraded oil at an inlet of the oil cleaning system, precipitating oil-soluble degradation products from the degraded oil by cooling the degraded oil using cooling means, passing the cooled degraded oil through a filter in a direction from the inlet to an outlet of the cleaning system so as to retain the precipitated degradation products in the filter, and discharging an outlet flow of cleaned oil through the outlet of the oil cleaning system.

The efficiency of the system for cleaning oil may depend on the system design in view of the particular set-up of machinery or industrial installation, the oil used in that set-up, and the operational conditions to which the oil is exposed under use. Implementation may therefore include a design phase for designing a system for cleaning oil in a given set-up. Design parameters may include cooling power and flow rate specifications, selecting filter material and size, and the like.

For a given design of a system for cleaning oil, the efficiency of the cleaning may depend on the actual operational parameters chosen for that system in view of the particular set-up, the oil used in that set-up, the operational conditions to which the oil is exposed under use, the level of degradation of the oil in the inlet flow, and the desired level of cleanliness of the oil discharged in the outlet flow. For example, the efficiency of the filtration step may depend on the actual input/output temperatures, cooling rates, dwell-time and/or flow rates, and the like. Implementation may therefore include a phase of testing and configuring the system to performing the method for cleaning degraded oil to the particular oil used and/or to the particular operational conditions in that set-up. The testing and configuring phase may include determining a saturation regime characterised by a temperature range beyond which the degraded oil has to be cooled in order to achieve adequate precipitation that is required for the filtration step to be efficient and achieve a pre-determined level of contamination after cleaning. The testing and configuring phase may also include determining a dwell-time for which the degraded oil has to be kept cold in the particular set-up in order to achieve adequate precipitation that is required for the filtration step to be efficient and achieve a pre-determined level of contamination (cleanliness) after cleaning. Comparing contamination levels before and after cleaning may be used as a measure for the performance of the cleaning process. Contamination levels may be determined e.g. by MPC measurements or any other analytic method for monitoring oil degradation.

Further according to one embodiment of the method according to the invention, cooling the degraded oil prior to filtration comprises cooling the oil downstream of the filter to a temperature below that of the degraded oil in the inlet flow, dividing the filtration flow at a branching point downstream of the filter into the outlet flow discharged through the outlet and a recirculation flow, feeding the recirculation flow back to a recombination point upstream of the filter, and recombining the recirculation flow with the inlet flow.

In this embodiment, the cooling of the oil is performed downstream of the filter, i.e. on the filtrate side. Under steady operation, the contamination level of the oil on the filtrate side is considerably reduced as compared to the oil in the inlet flow or in the filtration flow upstream of the filter. Arranging a cooling device for cooling the oil downstream of the filter has therefore the advantage that operation of the cooling device is not near as much affected by precipitation products that sediment or deposit in the cooling system as when cooling to precipitation temperatures is performed directly on a contaminated oil flow upstream of the filter, e.g. directly on the inlet flow.

The clean cooled oil from the recirculation flow is fed back into and mixed with the degraded oil of the inlet flow at a point of recombination upstream of the filter. By the combination of downstream cooling, recirculation of the cooled clean oil and mixing the cooled clean oil with the degraded oil at a recombination point upstream of the filter, the cooled clean oil acts as a cooling medium and the degraded oil of the inlet flow is cooled rapidly and efficiently. The sudden temperature drop achieved by the rapid cooling induces precipitation of the oil-soluble degradation products. Thereby, a principal part of the precipitation is induced upstream of the filter at a location separate from where the actual cooling is performed. In this way, the contaminants are effectively precipitated at a location where they can easily be retained, namely in the filter material of an easily replaceable filter element rather than anywhere else in the system.

Advantageously, the mixing is enhanced by providing passive and/or active mixing enhancement means provided at the point of recombination. By enhancing the mixing of the inlet flow and cooled clean oil of the recirculation flow, the cooling mechanism may be accelerated in order to promote precipitation. In addition to the accelerated cooling, the mixing may generate turbulence and/or local inhomogeneities acting as seeds for initiating precipitation, thereby further promoting the precipitation process.

Further according to one embodiment of the method according to the invention, cooling of the oil downstream of the filter is performed in the recirculation flow between the branching point and the recombination point. In this advantageous embodiment, the cooling is applied after dividing the filtration flow at the branching point and prior to recombining the recirculation flow with the inlet flow. Thereby cooling power is only applied to the recirculated oil and not to the portion of the clean oil discharged through the outlet. Thereby, the energy consumption is reduced.

Alternatively or in addition thereto, cooling may be provided downstream of the filter and prior to the branching point. Therefore, according to one embodiment of the method for cleaning degraded oil, cooling the degraded oil prior to filtration comprises cooling the oil downstream of the filter and prior to dividing the flow at the branching point. This embodiment is advantageous e.g. for systems, where the cleaned oil discharged by the outlet flow is to be used for cooling purposes.

Further according to one embodiment of the method according to the invention, the method further comprises the step of pre-cooling the degraded oil, wherein pre-cooling occurs prior to the step of precipitating oil-soluble degradation products from the degraded oil by cooling the degraded oil.

In a typical set-up of a machinery/installation/facility, the oil is operated at elevated temperatures, which may be well above 50° C., well above 60° C., above 70° C., above 80° C., or even above 90° C. (degrees Celsius). In particular when implementing the method for continuously cleaning oil in a set-up of a machinery/installation/facility in operation, the degraded oil received in the inlet flow may have an elevated temperature. The pre-cooling step has the purpose of pre-conditioning the inlet flow of degraded oil for the subsequent precipitation step. Pre-cooling is applied to the received degraded oil, wherein the temperature of the pre-cooled oil in the inlet flow is kept above the temperature of the cooled oil in the recirculation flow at the recombination point. Thereby it is ensured that the recirculation flow can cool the inlet flow. Furthermore, the temperature of the pre-cooled oil, i.e. the temperature of the degraded oil in the inlet flow after the pre-cooling step and upstream of the recombination point, is kept well above the temperatures where substantial precipitation of degradation products occurs.

Further according to one embodiment of the method according to the invention, the degraded oil of the inlet flow is cooled so as to decrease the solubility of one or more of the degradation products in the degraded oil below the concentration of the one or more of the degradation products present in the degraded oil.

The solubility of degradation products in the oil decreases with decreasing temperature. As a consequence, when cooling degraded oil comprising one or more different degradation products, the solution of a given degradation product in the oil gets closer and closer to its saturation point where the concentration of the degradation product equals its solubility. Eventually, the solution is cooled into a regime of super-saturation where the concentration of the degradation product exceeds the temperature-dependent solubility from which precipitates of the degradation product form.

As mentioned above, degraded oil is a complex fluid comprising numerous different degradation products dissolved in the oil. Each of these different degradation products may have different saturation points. For each of the different degradation products, the onset of precipitation may therefore occur at a slightly different temperature, and the onset of precipitate formation in the cooled degraded oil may be observed to be spread over a temperature range. Nevertheless, three temperature ranges may be distinguished. At high temperatures a solution regime exists where essentially all degradation products are in solution, i.e. the concentration of the degradation products is below their solubility for temperatures in the solution regime (essentially all degradation products are in sub-saturated solution). At low temperatures a precipitation regime exists where the concentration of essentially all degradation products to be removed from the oil is above their solubility (the degradation product solutions are in a supersaturated state). At intermediate temperatures between the solution regime and the precipitation regime a transition regime exists where for a first fraction of degradation products the concentration is below the solubility, and for a second fraction of degradation products, the concentration exceeds the solubility and precipitates form from the second fraction.

When implementing the method according to the invention in a given set-up, the relevant temperature ranges of the above mentioned regimes may be determined for that set-up, and subsequently the operation temperatures of the different steps in the method may be chosen accordingly. The skilled person may, for example, verify the performance of the implemented method and of the selected operation temperatures with respect to a predetermined cleaning goal by monitoring the precipitation rate obtained for different temperatures. The precipitation rate may e.g. be determined, by inspecting or by measuring the contamination level after the filter as a function of the temperature to which the degraded oil is cooled and/or the temperature to which the degraded oil is pre-cooled prior to the precipitation step (for a given inlet flow temperature and contamination level). Apart from the purpose of optimizing the precipitation rate and thus the cleaning efficiency, the temperature of the cooled oil in the precipitation step may also be subdue to further operational constraints, such as being able to flow the oil through a given filter.

Further according to one embodiment of the invention, the precipitation temperature to which the degraded oil is cooled prior to filtration is below 20 degrees C., alternatively below 15 degrees C., alternatively below 10 degrees C., alternatively below 8 degrees C., alternatively below 6 degrees C., alternatively below 5 degrees C., alternatively below 4 degrees C., alternatively below 3 degrees C., alternatively below 2 degrees C., alternatively below zero degrees C., alternatively below −5 degrees C., alternatively below −10 degrees C.

The precipitation temperature is the temperature of the degraded oil at a point after cooling, but prior to filtration. For example, in an embodiment using recirculation, the precipitation temperature is to be determined at a point between the recombination point and the filter. The lower the precipitation temperature, the better the chances for removing oil-soluble degradation products, and in particular oil-soluble degradation products that otherwise are difficult to catch, such as smell-causing contaminants, miscolouring causing contaminants and/or other contaminants related to low-molecular number degradation products and/or nitrous organic compounds. In particular, at the lowest precipitation temperature ranges below about 5 degrees Celsius, and further particularly at precipitation temperatures below 2 degrees Celsius, yet further particularly at temperatures below zero degrees Celsius, a surprisingly low output level of degradation may be achieved. In an embodiment, where cooling is performed down to temperatures below zero degrees Celsius, a heat exchange medium/coolant used in the cooling device/chiller may require use of an antifreeze agent comprised in the coolant.

The pour point of a liquid is the lowest temperature at which it becomes semi-solid and loses its flow characteristics. Therefore, the temperature of the oil throughout the method/system according to the invention should be kept above the pour point of the oil in question so as to be able to flow the oil. The precipitation temperature is kept above the pour point, alternatively at least above 5 degrees Celsius above the pour point, alternatively at least above 10 degrees Celsius above the pour point of the oil in question. Pour point data for a given oil are usually found in the data sheets of the oil in question and are therefore predetermined for the oil used in a given set-up. Alternatively the pour point of oil may be determined following the instructions of the relevant ASTM standard, such as ASTM D97. However, in set-ups, where the oil may contain considerable amounts of water that are not separated out prior to feeding the oil to the inlet, it may be required to keep the precipitation temperature above zero degrees C. in order to avoid problems due to formation of ice, e.g. inside the cooling device.

Further according to one embodiment of the method according to the invention, the temperature of the pre-cooled oil in the inlet flow is kept at a temperature where the solubility of the degradation products in the degraded oil exceeds the concentration of the degradation products present in the degraded oil.

Advantageously, the pre-cooling step pre-conditions the inlet flow of degraded oil to a temperature close to the transition regime, but not into the transition regime where appreciable precipitation appears. This has the advantage that the subsequent precipitation step where the temperature of the degraded oil is lowered from the solution regime, through the transition regime, and down into the precipitation regime, requires less cooling power and can be performed more rapidly. Furthermore, by keeping the temperature in the solution regime, no appreciable precipitation occurs prior to the actual precipitation step, thereby reducing the formation of undesired deposits outside the filter. Analogue to the procedure described above for determining the appropriate cooling temperature, the appropriate temperature to which the degraded oil is pre-cooled prior to the precipitation step in a given set-up can be determined by routine experimentation.

Further according to one embodiment of the method according to the invention, pre-cooling comprises transferring heat from the inlet flow to the outlet flow by means of a heat-exchanger. By exploiting the lower temperature of the cleaned oil of the outlet flow for pre-cooling the inlet flow, the method becomes more energy efficient. Furthermore, the cleaned oil to be returned to the set-up is brought back to higher temperatures closer to the operating temperature of the oil required by the set-up.

Further according to one embodiment, the method according to the invention further comprises controlling an inlet flow rate of the inlet flow, controlling a filtration flow rate of the filtration flow for passing the cooled degraded oil through the filter, and/or controlling a recirculation flow rate of the recirculation flow. Flow rates may be controlled using flow control means, such as pumps, throttle valves, thermostat valves, constrictions, biased check valves, or the like. In particular, according to one embodiment the inlet flow rate may be controlled using an inlet pump. The recirculation flow may be controlled by a recirculation pump and/or a thermostat valve, wherein the thermostat valve may be responsive to the input of a temperature sensor measuring a temperature representative of the oil temperature in the filter. Controlling the inlet, filtration and/or recirculation flow rates with respect to each other allows for controlling a recirculation ratio, i.e. how many times on average the oil is re-circulated in the system before it is discharged through the outlet. In the case of cooling applied in the recirculation branch, this also allows for controlling the cooling effect of the recirculation flow on the inlet flow, and thus the precipitation rate.

Further according to one embodiment of the method according to the invention, the method is applied to a set-up having a total oil volume, and wherein the volume of oil cleaned per hour is between 0.05% and 5%, preferably between 0.1% and 2% of the total oil volume of the set-up. Advantageously, the volume of oil cleaned per hour is less than 500 litres, alternatively less than 400 l, alternatively less than 300 l, alternatively less than 200 l, and preferably less than 100 l. The cleaning rate may be controlled e.g. by controlling the inlet flow rate, wherein the outlet flow rate corresponds to the inlet flow rate. The method for cleaning degraded oil may be operated in a continuous/continuing operation mode, wherein the inlet flow of degraded oil is received directly from the set-up under operation and the outlet flow of cleaned oil is returned to the set-up under operation. Typically, low cleaning rates may be employed when cleaning in a continuous/continuing operation mode, and should be adapted to a rate of degradation observed or known for the respective set-up. Continuous operation mode thus allows for smaller scale apparatus for carrying out the method than when operating in batch mode. Furthermore it is advantageous to operate the cleaning method in a continuous/continuing maintenance mode so as to retain degradation products at an early stage of a degradation reaction chain, thereby efficiently intercepting the formation of higher order degradation products. Thereby the quality of the oil in the set-up is maintained at a higher level. Further advantageous ranges for the cleaning rate in continuous/continuing operation on a typical set-up with are between 0.1% and 1%, alternatively between 0.1% and 0.5%, or about 0.2% of the total oil volume of the set-up. Alternatively, the method for cleaning degraded oil may be operated in a batch mode, wherein the inlet flow of degraded oil is received from a first reservoir of degraded oil, and the outlet flow of clean/cleaned oil is discharged into a second reservoir. Typically, when cleaning a total volume of oil from a given set-up in batch mode, large cleaning rates are desired to reduce processing time.

Further according to one embodiment, the method according to the invention further comprises controlling the dwell-time. Advantageously, the dwell-time may be controlled by controlling the inlet flow rate, the outlet flow rate, the filtration flow rate and/or the recirculation flow rate by flow control means as indicated above. Preferably, the dwell-time is controlled in response to a level of contamination of the oil in the inlet flow and/or in response to a level of contamination of the oil in the outlet flow. As mentioned above, the level of contamination reflects the level of degradation of the oil, and may be determined by known methods of measurement, such as by measuring the MPC value of a sample of the oil. The precipitation and filtering kinetics may depend on the level of contamination of the degraded oil in the inlet flow. By adjusting the dwell-time in response to a level of contamination in the inlet flow and/or in the outlet flow, the dwell-time can be adjusted according to the precipitation and filtering kinetics of the input contamination level, thereby optimising the cleaning efficiency of the method, achieving an optimised cleaning throughput and eventually a lower output contamination level. Preferably, the dwell-time is adjusted by reducing the filtration flow rate for a decreasing input contamination level, thus increasing dwell-time for a decreasing input degradation level. Thereby, an improved retaining of the precipitates in the filter medium and a corresponding lower output contamination level is achieved. Accordingly, for high input levels of contamination of the oil in the inlet flow, such as in a start-up phase of the cleaning method, the filtration flow rate is kept at a higher level, thereby achieving a higher throughput at the trade-off of a higher output level of contamination of the oil in the outlet flow. Advantageously, the dwell-time is adjusted by controlling the filtration flow rate either directly, by controlling the inlet/outlet flow rate and/or by controlling the recirculation flow rate. Further advantageously, the dwell-time is adjusted responsive to a measured, calculated and/or simulated input contamination level.

Advantageously according to one embodiment of the method for cleaning degraded oil, the method further comprises controlling the cooling power and/or temperature in the precipitation step in response to a level of contamination of the oil in the input flow and/or controlling the pre-cooling power and/or temperature in the pre-cooling step in response to a level of contamination of the oil in the inlet flow and/or in the outlet flow.

Advantageously according to one embodiment of the method for cleaning degraded oil, the filtering interaction between the oil and the filter material is adsorption and/or absorption of the precipitated contaminants. Further advantageously, the filter material comprises cellulose fibres.

According to a further aspect of the invention, a system is provided, the system being adapted for carrying out the method according to any of the embodiments mentioned in the present application.

According to a further aspect of the invention, in the following advantageous embodiments of a system for cleaning degraded oil are described. A system for cleaning degraded oil according to the invention benefits from analogous considerations and advantages as mentioned above with regard to the method for cleaning degraded oil.

According to one embodiment of a system for cleaning degraded oil comprising oil-soluble degradation products, the system comprises an inlet for receiving an inlet flow of degraded oil, an outlet for discharging an outlet flow of cleaned oil, a filtration branch connecting the inlet and the outlet, the filtration branch comprising a filter arranged so as to pass a filtration flow at a filtration flow rate through the filter in a direction from the inlet to the outlet, and means for cooling the degraded oil to a precipitation regime and means for keeping the degraded oil at the precipitation temperature for a dwell-time prior to filtration so as to cause degradation products dissolved in the oil to precipitate and to retain the precipitated degradation products in the filter. Means for keeping the degraded oil at the temperature for a dwell-time may comprise thermal insulation of the pipes and tubing in the system, as well as thermal insulation of the filter housing. In addition, active cooling devices may be provided for keeping the degraded oil cold.

Further according to one embodiment, a system according to the invention further comprises a recirculation branch extending from a flow dividing element arranged downstream of the filter to a flow combining element arranged upstream of the filter, wherein the flow dividing element is adapted to divide the filtration flow into the outlet flow and a recirculation flow, wherein the recirculation branch is adapted to pass the recirculation flow in a direction from the flow dividing element to the flow combining element, and wherein the flow combining element is adapted to combine the inlet flow with the recirculation flow and to pass the combined flow as filtration flow to the filter element for filtration, and wherein the cooling means comprise a cooler arranged downstream of the filter so as to cool the recirculation flow to temperatures below an oil temperature of the inlet flow at the flow combiner. Downstream cooling of filtered oil in combination with returning the cooled clean oil to the filtration flow at a point upstream of the filter improves precipitation and thus cleaning efficiency and furthermore improves reliability of the cleaning system. In this embodiment, cooling of the degraded oil is done by the intermediate of cleaned oil as a cooling medium, which is add-mixed to the inlet flow. In order to achieve a cooling effect, this implies that the recirculation flow should have a lower temperature than the inlet flow of degraded oil at or immediately prior to recombination/mixing of the flows in the flow combiner.

This embodiment is also advantageous, because the cooling device acts on cleaned oil with a low concentration of oil-soluble degradation products. Therefore, the cooling device used, such as an open tank/flow-through chiller or the like, is not affected by a pronounced deposition of precipitates therein.

Further according to one embodiment of the system according to the invention, the cooling means are arranged in the recirculation branch. By arranging the cooling means downstream of the flow divider in the recirculation branch, the cooling is only applied to the cleaned oil in the recirculation flow, and not to the outlet flow, thereby avoiding the waste of cooling power on oil discharged from the cleaning system.

Further according to one embodiment of the system according to the invention, mixing enhancement means are provided in the flow combiner. Means for enhancing mixing may be passive mixing means, such as a flow mixing spiral or an arrangement of baffles in the filtration flow placed after the inlet flow and the recirculation flow have been re-combined, and/or active mixing means, such as a stirring device or the like. By enhancing the mixing of the inlet flow and cooled clean oil of the recirculation flow, a very efficient and rapid cooling mechanism is provided that rapidly may bring the oil in the filtration flow upstream of the filter in a supersaturated state from which precipitation occurs. Furthermore, the mixing may generate turbulence and/or local inhomogeneities acting as seeds for initiating precipitation, thereby further accelerating the kinetics of the precipitation process.

Further according to one embodiment, a system according to the invention further comprises pre-cooling means for pre-cooling the oil received at the inlet. As mentioned above with respect to the method of cleaning degraded oil, the purpose of pre-cooling is to bring the degraded oil received from a set-up having an elevated operation temperature closer to the temperatures where appreciable precipitation sets on, but not into the precipitation regime.

Further according to one embodiment of the system according to the invention, the pre-cooling means comprise a heat-exchanger for transferring heat from the inlet flow to the outlet flow. Pre-cooling of the oil in the inlet flow may at least be supported, if not fully provided, by transferring heat from the warm inlet flow to the cold outlet flow by means of the heat exchanger. At the same time, the oil from the outlet flow is pre-heated to temperatures closer to the operating temperature of the oil required by the set-up to which it is returned. Thereby, energy efficiency of the cleaning system may be improved. Advantageously, the heat exchanger may be a cross-flow heat exchanger. Further pre-cooling means may e.g. comprise an air-cooling heat exchanger and/or a cooling fan.

Further according to one embodiment, a system according to the invention further comprises means for controlling the inlet flow, means for controlling the filtration flow, and/or means for controlling the recirculation flow.

Further according to one embodiment, a system according to the invention further comprises means for controlling an inlet flow rate of the inlet flow, means for controlling the filtration flow rate of the filtration flow, and/or means for controlling a recirculation flow rate of the recirculation flow.

Further according to one embodiment of the system according to the invention, the means for controlling the inlet flow and/or the filtration flow and/or the recirculation flow comprise pumping means and/or a thermostat controlled valve and/or a biased check valve. Pumping means may be used to set a flow rate for the inlet flow, the recirculation flow and/or the filtration flow. The desired flow rate may be determined in response to a sensor input and/or a programmed control. Advantageously in one embodiment, a thermostat controlled valve may be arranged in the recirculation branch so as to control the recirculation flow rate in response to a signal input representative of the temperature of the oil in the filter. Biased check valves may be employed to control the flow direction and a minimum pressure in the different branches of the system. For example, a biased check valve may be arranged between the branching point and the outlet of a system according to one embodiment, wherein the biased check valve opens for discharging the outlet flow of cleaned oil through the outlet at pressures above 0.5 bar and blocks for any backflow of oil from the outlet into the system.

BRIEF DESCRIPTION OF THE DRAWINGS

In the following the invention is further explained by reference to advantageous embodiments, wherein like reference signs refer to corresponding/analogue features. The drawings show on FIG. 1 a diagrammatic presentation of a system and method for cleaning degraded oil according to one embodiment of the invention, FIG. 2 a diagrammatic presentation of a system and method for cleaning degraded oil according to another embodiment of the invention, FIG. 3 a diagrammatic presentation of a system and method for cleaning degraded oil according to a further embodiment of the invention,

DETAILED DESCRIPTION OF THE INVENTION

Figure 1:
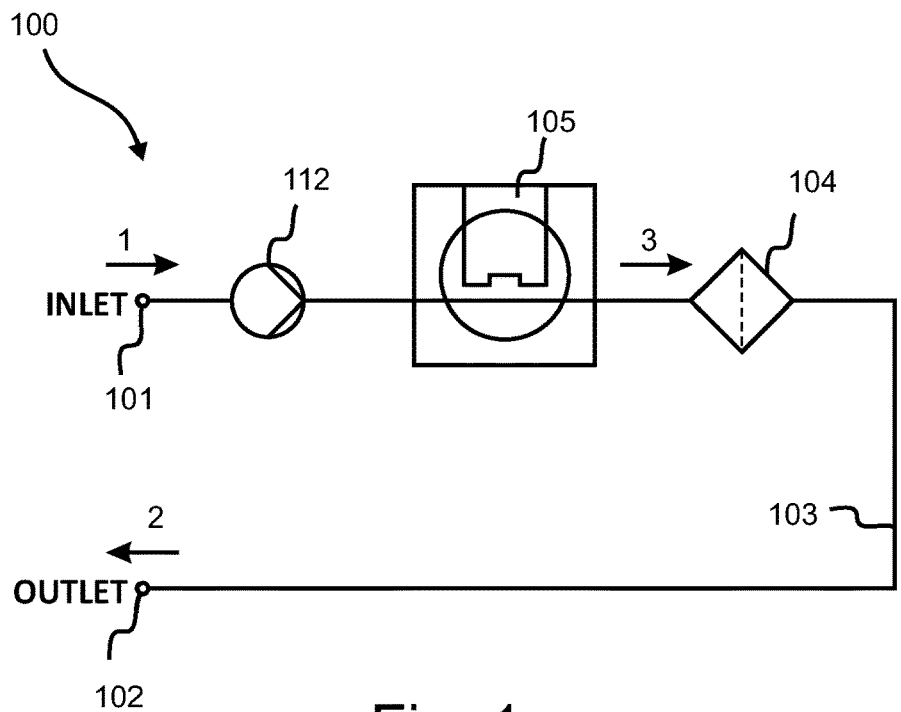
Figure 2:
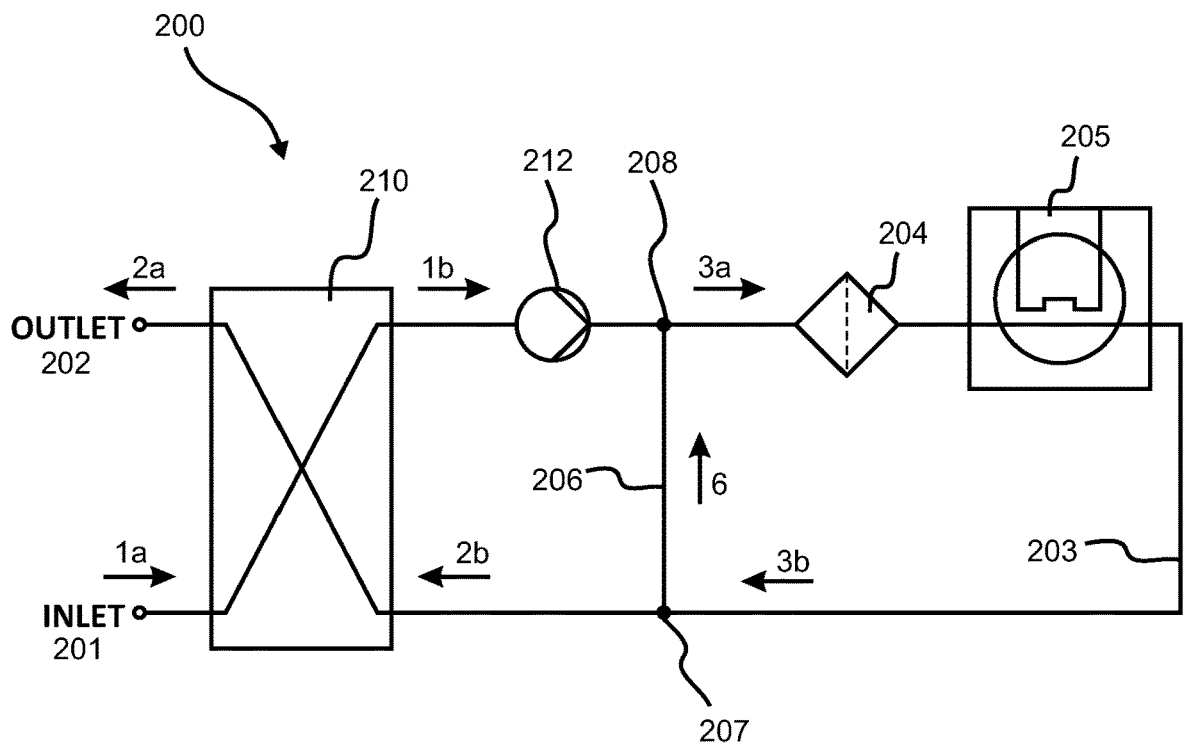
Figure 3:
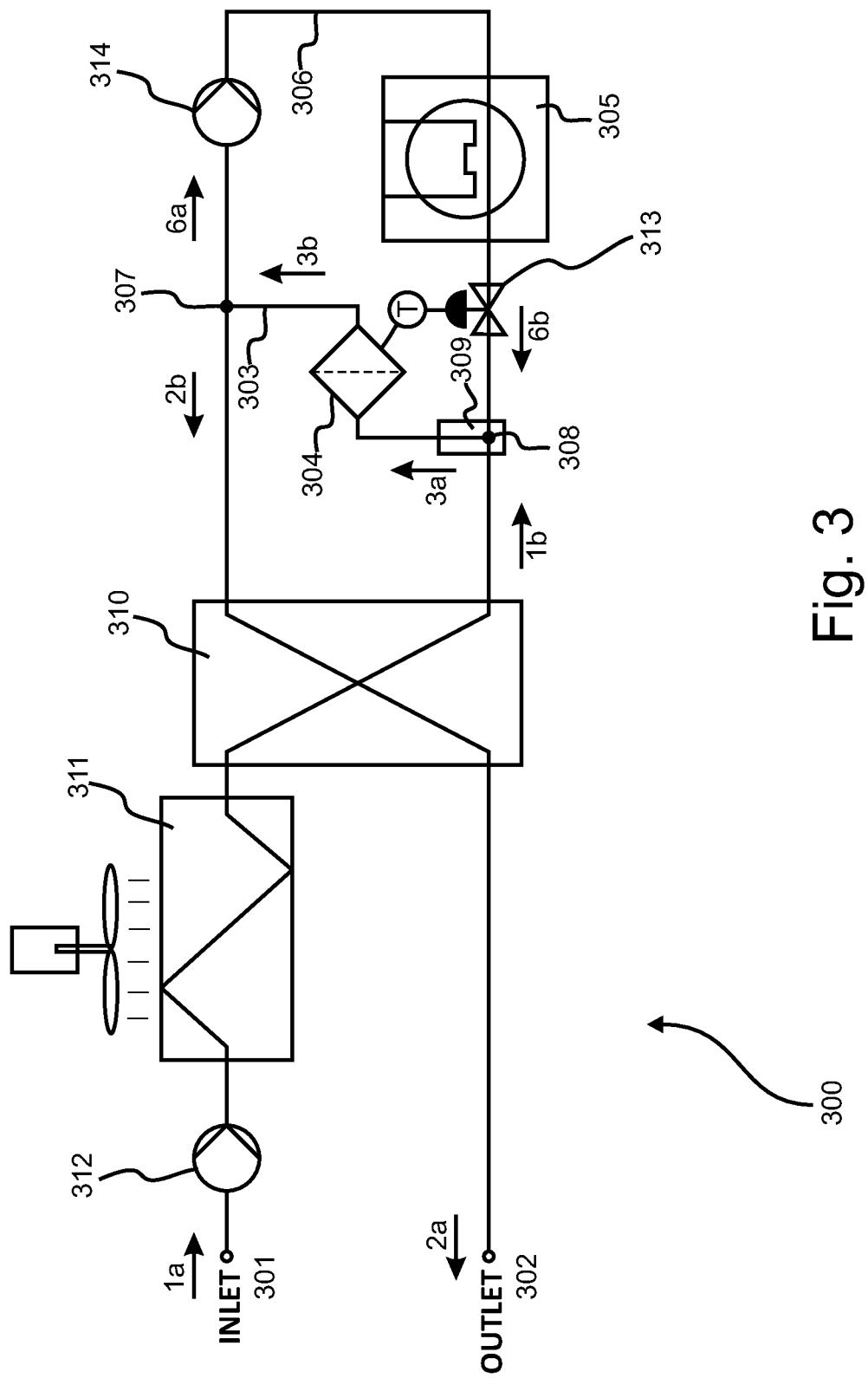

FIGS. 1-3 show schematically different embodiments 100, 200, 300 of a method and a system for cleaning degraded oil. FIG. 1 shows a simple embodiment 100 with a precipitation cooler 105 arranged upstream of filter 104, whereas FIGS. 2 and 3 show more complex embodiments 200, 300 comprising a recirculation branch 206, 306 where a cooler 205, 305 is arranged downstream of filter 204, 304, and the precipitation by cooling is performed by mixing the degraded oil with recirculated cooled oil at a recombination point 208, 308 upstream of the filter 204, 304. A major difference between the embodiment 200 of FIG. 2 and the embodiment 300 of FIG. 3 is that, the former 200 comprises cooling of the filtrate prior to dividing the flows into outlet flow and recirculation flow at a branching point 207, whereas the latter 300 comprises cooling the filtrate in the recirculation branch 306 between the branching point 307 and the recombination point 308. Advantageously for all embodiments 100, 200, 300, the filtering interaction for retaining the precipitates in the filter material is adsorption and/or absorption.

In the embodiment 100 of FIG. 1 an inlet flow 1 of degraded oil is received at an inlet 101, e.g. from a set-up (not shown) having a total volume of oil subdue to degradation due to its use in the set-up. A pump 112 drives the received oil at an inlet flow rate through a cooler 105, which is adapted to reduce the temperature of the degraded oil into a precipitation regime at a flow rate corresponding to the inlet flow rate. As mentioned above, the solubility of the degradation products to be removed by the present method/system decreases with temperature. In the precipitation regime, the solubility of oil-soluble degradation products to be removed from the degraded oil is below the concentration of these degradation products in the degraded oil and substantial precipitation of these degradation products is observed. From the cooler 105, the cold degraded oil is passed in a filtration flow 3 through filter 104. The volume of the filter 104 and the filtration flow rate are adapted to maintain the cold oil in the filter for a dwell-time allowing precipitates of the degradation products to form and to be retained by the filter material. Finally, an outlet flow 2 of cleaned oil with a reduced concentration of oil-soluble degradation products as compared to the degraded oil in the inlet flow 1 is discharged through outlet 102 and may be returned to the set-up. The pump 112, the cooler 105, and the filter 104 are arranged in series in the same line forming filtration branch 103 extending from the inlet 101 to the outlet 102.

In the embodiment 200 of FIG. 2 an inlet flow 1a of degraded oil is received at an inlet 201, e.g. from a set-up (not shown) having a total volume of oil subdue to degradation due to its use in the set-up. The inlet flow 1a is passed through a pre-cooler 210 for reducing the temperature of the received degraded oil. The use of a pre-cooler is particularly advantageous when operating the system/method for cleaning oil of a set-up under operation, i.e. where degraded oil is received at an elevated operating temperature directly from the set-up. The temperature of the oil in the inlet flow 1b after pre-cooling should be kept in a solution regime, where the temperature dependent solubility of the oil-soluble degradation products to be removed exceeds the concentration of these degradation products present in the degraded oil. In other words, the pre-cooling step should be adapted such that it does not anticipate the precipitation step. A pump 212 drives the pre-cooled oil 1b at an inlet flow rate to a recombination point with a flow combiner 208 where the inlet flow 1b is mixed with a recirculation flow 6 received from a recirculation branch 206 and passed as a filtration flow 3a with a filtration flow rate to a filter 204 arranged in a filtration branch 203, and further to a cooler 205 also arranged in the filtration branch downstream of the filter 204. The filtration branch 203 of embodiment 200 thus comprises both the filter 204 and the cooler 205. However, in contrast to embodiment 100, the cooler 205 is placed downstream of the filter 204 on the filtrate side. The flow of cooled oil 3b in the filtration branch downstream of the cooler 205 is divided at a branching point with a flow divider 207 into an outlet flow 2b and the recirculation flow 6, which via recirculation branch 206 is fed back to the recombination point 208 upstream of the filter 204. By placing the cooler 205 in the filtration branch 203 prior to dividing the flow at branching point 207 rather than in the recirculation branch 206, the cooling power of the cooler 205 is applied to both the recirculation flow 6 and the outlet flow 2b. By mixing the cold filtered oil from the recirculation flow 6 into the inlet flow 1b, the degraded oil is cooled. The cooling power of the cooler 205 is adapted so as to reduce the temperature of the degraded oil in the filtration flow 3a into a precipitation regime, where substantial precipitation of the oil-soluble degradation products to be removed from the degraded oil is observed. The precipitates are formed at and after the recombination point 208 and the precipitates are retained in the filter 204. The volume of the filter 204 and the filtration flow rate are adapted to maintain the cold oil in the filter 204 for a dwell-time allowing precipitates of the degradation products to form and to be retained by the filter material.

During a start-up phase, for example when connecting the method/system for cleaning of degraded oil to a set-up in operation, which already contains degraded oil with a high level of contamination with oil-soluble degradation products, the cooling power of the cooler 205 may have to be ramped up gradually while keeping inlet and filtration flow rates high in the beginning and decreasing the flow rates to a steady state configuration as the contamination level is brought down. Alternatively or in addition thereto, the cooler may be pre-filled with clean oil and cooled to operation temperature before coupling the cleaning method/system to the set-up so as to achieve a good cleaning performance more quickly.

The outlet flow 2b of cold clean oil may be used to pre-cool the inlet flow 1a of degraded oil. To this end, the pre-cooler 210 may advantageously be a cross-flow heat exchanger where heat from the degraded oil of the inlet flow 1a is transferred to the cold clean oil of the outlet flow 2b. Thereby, the clean oil of the outlet flow 2b is pre-heated before it is discharged through outlet 202 as pre-heated outlet flow 2a and returned to the set-up. As mentioned above, the cooling power of the cooler 205 in embodiment 200 is applied to both the recirculation flow 6 and the outlet flow 2b. Thereby the pre-cooling effect of the heat exchanger 210 is increased.

FIG. 3 shows a diagram of a further embodiment 300 of the method/system for cleaning degraded oil. Embodiment 300 comprises an inlet 301 for receiving an inlet flow 1a of degraded oil, an outlet 302 for discharging an outlet flow 2a of cleaned oil, an inlet pump 312 driving the inlet flow 1a through a pre-cooler comprising a cross-flow heat exchanger 310 for transferring heat from the inlet flow 1a to an outlet flow 2b, and a, preferably fan assisted, liquid-to-air heat exchanger 311. The pre-cooled inlet flow 1b is mixed with a recirculation flow 6b at a recombination point with a flow combiner 308 and passed as a filtration flow 3a to a filter 304 arranged in a filtration branch 303 connecting the inlet 301 with the outlet 302.

As in the embodiment 200 of FIG. 2, the embodiment 300 of FIG. 3 comprises a cooler 305 arranged downstream of the filter 304 and a recirculation branch 306 extending from a branching point with a flow divider 307 downstream of the filter 304 to the recombination point 308 upstream of the filter 304. However, in contrast to embodiment 200, the cooler 305 of embodiment 300 is arranged in the recirculation branch 306. The cooler 305 thus acts directly on the recirculated flow 6a, 6b, and only indirectly cools the outlet flow 2b. The recirculation flow may preferably be driven by a recirculation pump 314 arranged in the recirculation branch 306. The recirculation flow rate may be controlled by further flow control means, such as a thermostat-valve 313 responsive to a temperature sensor measuring the oil temperature in the filter 304. The flow combiner at the recombination point 308 acts as a precipitation reactor. Additional mixing enhancement means 309 may be provided in the flow combiner at recombination point 308 so as to accelerate the recombination of the recirculation flow 6b and the inlet flow 1b, thereby promoting precipitation in the filtration flow 3a upstream of the filter 304.

Adaptation of the method/system for cleaning of degraded oil to its use in a particular set-up may include adapting the cooling power of the cooler, the filter size, the flow rates and/or flow capacities. Adapting may include dimensioning and configuring at a design stage of a cleaning system, configuring parameter settings during a run-in phase, and/or configuring and controlling parameter settings during operation. During operation, the controlling function may be responsive to a pre-configured target value setting for a given parameter, optionally in combination with a sensor input measuring the actual value of the given parameter or a quantity affecting that parameter.

In the following, an example is given for a method/system adapted for the continuous cleaning of the oil in a turbine set-up of a power plant having a total volume of oil of about 40 000 litres. As can be seen from the numbers below, one of the advantages of continuously cleaning the oil in use is that the cleaning system required is surprisingly small and thus less costly as compared to batch processing equipment, because cleaning can be performed at the rate of degradation. In addition, by removing the oil-soluble degradation products essentially as they are formed, the reaction chain of the formation of varnish precursors and other degradation products may be intercepted at a relatively early stage, thus avoiding the formation of higher order degradation products that may deposit as varnish inside the set-up and/or otherwise severely affect the performance of the oil and the set-up itself. This further enhances the life-time of the set-up and even more important may considerably improve the up-time of the set-up.

EXAMPLES

In a typical set-up of a power plant turbine with a total oil volume of 40 000 litres, the oil received at the inlet may have a temperature of about 90° C. and an input contamination level characterised by an MPC value of about 30. A first pre-cooling stage with a fan-assisted liquid-to-air heat exchanger may reduce the temperature in the inlet flow to about 50° C. A further pre-cooling stage with a cross-flow heat exchanger for transferring heat from the inlet flow to the outlet flow may further reduce the temperature in the inlet flow to about 20° C. at the flow combining element prior to mixing with the re-circulated oil. The recirculated oil may be received from a cooler placed in the recirculation branch and have a temperature of about 3-4° C. at the flow combining element prior to mixing with the degraded oil from the inlet flow having a temperature of 20° C.

In a steady state situation, the inlet flow may be controlled by an inlet pump at an inlet flow rate of about 40-50 l/h. The recirculation flow may be controlled by a recirculation pump at a flow rate that is larger than the inlet flow rate, e.g. up to 10 times the inlet flow rate, or about 6 times the inlet flow rate. In combination, the inlet flow rate and the recirculation flow rate determine the filtration flow rate. The filter volume divided by the filtration flow rate determines the dwell-time for oil. Adjusting the filtration flow rate by varying the inlet flow rate and/or the recirculation flow rate thus allows controlling the dwell-time for interaction of the oil with the filter material inside the filter. A typical value for the dwell-time in a steady state of a continuous operation mode may be about 1 h, but may be varied depending e.g. on contamination load in the inlet flow and/or the pressure drop across the filter to between half an hour or up to 3 or even up to 6 hours, wherein longer dwell-times may be required at lower contamination levels, i.e. where the contaminant concentration of oil-soluble degradation products is low, such as for input MPC values of 10-20, and output MPC values of below 10.

A retaining efficiency of the method/system according to some embodiments of the invention may also be influenced by adjusting the precipitation temperature in the filtration flow after cooling, but prior to the filtration step/filter. In a given power plant turbine set-up using ISO VG 32 or ISO VG 46 turbine oil, such as Regal R&O 46, Mobil DTE 832, or Mobil DTE 732, an exit MPC value of about 20 may be achieved in the outlet flow by merely pre-cooling the inlet flow to about 30 degrees Celsius, but without any further active cooling of the inlet flow. By cooling the degraded oil to a precipitation temperature of about 9 degrees Celsius, an exit MPC-value of about 8 may be achieved, whereas at a precipitation temperature of about 2 degrees Celsius, an exit MPC-value of about 2 may be achieved in the outlet flow. In particular at lower precipitation temperatures a surprisingly good removal of degradation related smell and miscolouring is observed.

While being conceived for set-ups of large installation/facilities having a total oil volume of 10 000 litres or more, typically about 40 000 litres or even 100 000 litres, the method and system may be scaled to also be carried out in set-ups with smaller oil volumes.

Analytical Methods for Monitoring Oil Degradation

As mentioned above, a number of different analytical methods are available that are useful for monitoring an oil cleaning process and its performance in a given set-up, preferably with reference to a corresponding reference measurement on fresh oil. The measurements may be used for determining any deviations/changes/trends over time and/or between input and output of the cleaning process. Examples for such analytical methods for monitoring degradation of oil are given in the following.

Total acid number (TAN): The increase in carboxylic acids leads to an increase in Total Acid Number. TAN is measured by titration with KOH, and the result is given as mg KOH used to neutralize the acid per gram of oil sample. Example: TAN: 0.35 mg KOH/g.

Viscosity: Oxidation by-products tend to combine and form larger molecules, this process is called polymerization. As the viscosity of the oil is related to the size of the molecules, the polymerization leads to an increase in oil viscosity. If the polymerization continues sludge and varnish will form in the oil.

Ultra centrifuge (UC): A given amount of oil is centrifuged for 30 minutes at 18,000 rpm in an ultra-centrifuge. The amount of sediments is compared to a UC rating scale, and the UC value (1 to 8) is given based on a visual evaluation.

Infrared spectroscopy (typically FT-IR): The FT-IR spectrum is obtained by measuring the degree of infrared absorption in the spectral region of 4000 $cm^{-1}$-500 $cm^{-1}$ when passing infrared light through an oil sample. Oxidation by-products like aldehydes, ketones and carboxylic acids all contain carbon-oxygen double bonds (carbonyl groups). These carbonyl groups absorb infrared light in the 1740 $cm^{-1}$ region of the infrared spectrum. As oxidation increases, the absorbance peak will increase in this region. Deviations are seen between oil types, additives, type of degradation etc. Thermal degradation of base oil is not significant at 1740 $cm^{-1}$, instead a peak is seen at 1640-1600 $cm^{-1}$ (nitration peak).

Remaining useful life evaluation routine (RULER): The RULER measures the level of antioxidants and antiwear additives in mineral and synthetic based oils, and as such the test is not directly related to oxidation measurement, but may indicate coming oxidation issues at an early state. The test is done by mixing oil sample with a solvent and a solid substrate in a vial, thereby separating the antioxidant from the oil, followed by measurement using an electrode. The measured RUL number is then compared with a standard RUL number of a fresh oil of same brand. Oxidation leads to depletion of additives (decrease in RUL number). By monitoring additive depletion oil degradation can be detected at an early state.

Membrane patch colorimetry (MPC) test: Insoluble deposits are extracted from an oil sample using a 0.45 μm nitro-cellulose patch, vacuum filtration and petroleum ether as solvent. Membranes are left to dry and the color of the patch is analysed using a handheld spectrophotometer. Results are reported as a ΔE value. Interpretation of delta E values measured is divided into 4 ranges of severity: Normal range: ΔE<15, Monitor range: ΔE 15-30, Abnormal range: ΔE 30-40 and Critical range: ΔE >40.

Quantitative spectrophotometric analysis (QSA): This test is similar to the MPC test. Insoluble deposits are extracted from an oil sample using a 0.45 μm nitro-cellulose patch, vacuum filtration and a solvent. Membranes are left to dry and the color of the patch is measured. A rating of 1 to 100 indicates the propensity of the lubricant to form sludge and varnish.

Rotary pressure vessel oxidation test (RPVOT): The RPVOT analysis measures the oxidation stability of oil when exposed to accelerated oxidation in a sealed chamber filled with oxygen under pressure at elevated temperature. The sample is placed in a vessel with a polished copper coil. The vessel is then charged with oxygen and placed in a bath at a constant temperature of 150° C. As the oil absorbs oxygen the pressure in the sealed chamber drops. The result is expressed as the time (minutes) required for achieving a pressure drop to a predetermined level.

| Reference numbers | |
| --- | --- |
| inlet flow | 1, 1a, 1b |
| outlet flow | 2, 2a, 2b |
| filtration flow | 3, 3a, 3b |
| recirculation flow | 6 |
| cleaning system | 100, 200, 300 |
| inlet | 101, 201, 301 |
| outlet | 102, 202, 302 |
| filtration branch | 103, 203, 303 |
| filter | 104, 204, 304 |
| cooler | 105, 205, 305 |
| recirculation branch | 206, 306 |
| branching point, flow dividing element | 207, 307 |
| recombination point, flow combining element | 208, 308 |
| mixing means | 309 |
| pre-cooling means | 210, 310, 311 |
| flow control means | 112, 212, 312, 313, 314 |

The invention claimed is:

1. A method for cleaning degraded oil comprising oil-soluble degradation products, comprising:
receiving an inlet flow (1, 1a, 1b) of degraded oil;
precipitating oil-soluble degradation products from the degraded oil by cooling the degraded oil to a precipitation regime and keeping the degraded oil in the precipitation regime for a dwell time, wherein the cooling is done by mixing, at a recombination point (208, 308) the inlet flow (1, 1a, 1b) of degraded oil with a recirculation flow (6, 6a, 6b) consisting of cooled filtered oil having a temperature below the temperature of the inlet flow of degraded oil, resulting in cooled mixed oil;
passing the cooled mixed oil as a filtration flow (3, 3a, 3b) through a filter (104, 204, 304) so as to retain the precipitated degradation products in the filter (104, 204, 304);
dividing the filtration flow at a branching point (207, 307) downstream of the filter (104, 204, 304) into an outlet flow (2, 2a, 2b) of filtered oil and the recirculation flow (6, 6a, 6b) of filtered oil;
cooling the recirculation flow of filtered oil, using a cooler (205, 305) arranged downstream of the filter (104, 204, 304), and returning the cooled filtered oil to the recombination point (208, 308) for mixing with the inlet flow (1, 1a, 1b) of degraded oil; and
discharging the outlet flow (2, 2a, 2b) of cleaned oil with degradation products removed.

2. The method of claim 1, wherein the degraded oil of the inlet flow is cooled to decrease the solubility of one or more of the degradation products in the degraded oil below the concentration of the one or more of the degradation products present in the degraded oil.

3. The method of claim 1, wherein a precipitation temperature to which the degraded oil is cooled prior to filtration is below 20 degrees C., and is kept at a temperature above a pour point of the degraded oil.

4. The method of claim 1, further comprising:
pre-cooling the degraded oil prior to precipitating oil soluble degradation products from the degraded oil by cooling the degraded oil.

5. The method of claim 4, wherein the temperature of the pre-cooled oil in the inlet flow is kept at a temperature where the solubility of the degradation products in the degraded oil exceeds the concentration of the degradation products present in the degraded oil.

6. The method of claim 5, wherein pre-cooling comprises transferring heat from the inlet flow to the outlet flow by means of a heat exchanger (210, 310).

7. The method of claim 1, further comprising one or more of:
controlling an inlet flow rate of the inlet flow, controlling a filtration flow rate of the filtration flow for passing the cooled mixed oil through the filter, and controlling a recirculation flow rate of the recirculation flow of filtered oil.

8. The method of claim 1, wherein the method is applied to a set-up having a total oil volume, and wherein the volume of oil cleaned per hour is between 0.05% and 5% of the total oil volume of the set-up.

9. The method of claim 1, further comprising:
controlling the dwell time, in response to one or more of:
a level of contamination of the oil in the inlet flow, and
a level of contamination of the oil in the outlet flow.

10. A system (100, 200, 300) for cleaning degraded oil comprising oil-soluble degradation products, comprising:
an inlet (101, 201, 301) for receiving an inlet flow (1, 1a, 1b) of degraded oil;
an outlet (102, 202, 302) for discharging an outlet flow (2, 2a, 2b) of cleaned oil;
a filtration branch (103, 203, 303) connecting the inlet and the outlet, the filtration branch comprising a filter (104, 204, 304) arranged so as to pass a filtration flow (3, 3a, 3b) through the filter (104, 204, 304) in a direction from the inlet to the outlet (102, 202, 302);

cooling means (105, 205, 305) providing cooling of the degraded oil to a precipitation regime and means for keeping the degraded oil at a precipitation temperature for a dwell time prior to filtration to cause degradation products dissolved in the oil to precipitate and to retain the precipitated degradation products in the filter, the cooling means effecting cooling by mixing the degraded oil with a recirculation flow (6, 6a, 6b) consisting of cooled filtered oil having a temperature below the temperature of the inlet flow of degraded oil prior to passing the filtration flow (3, 3a, 3b) through the filter (104, 204, 304); and a recirculation branch (206, 306) extending from a flow dividing element (207, 307) arranged downstream of the filter (104, 204, 304) to a flow combining element (208, 308) arranged upstream of the filter (104, 204, 304), wherein the flow dividing element (207, 307) is adapted to divide the filtration flow of oil into the outlet flow (2, 2a, 2b) of filtered oil and the recirculation flow (6, 6a, 6b) of filtered oil, respectively, wherein the recirculation branch (206, 306) is adapted to pass the recirculation flow (6, 6a, 6b) of filtered oil in a direction from the flow dividing element (207, 307), through a cooler (205, 305) adapted to cool the filtered oil to a temperature below that of the inlet flow (1, 1a, 1b) of degraded oil, to the flow combining element (208, 308), and wherein the flow combining element (208, 308) is adapted to mix the inlet flow of degraded oil with the recirculation flow (6, 6a, 6b) of cooled filtered oil to effect cooling of the degraded oil, and to pass the mixed flow as the filtration flow to the filter element.

11. The system of claim 10, wherein mixing enhancement means (309) are provided in the flow combining element.

12. The system of claim 10, further comprising pre-cooling means (210, 310, 311) for pre-cooling the oil received at the inlet, wherein the pre-cooling means comprise a heat exchanger (210, 310) for transferring heat from the inlet flow to the outlet flow.

13. The system of claim 10, further comprising means (112, 212, 312) for controlling the inlet flow (1, 1a, 1b), means for controlling the filtration flow (3, 3a, 3b), and/or means (313, 314) for controlling the recirculation flow (6, 6a, 6b) of oil, wherein the means for controlling the inlet flow and/or the filtration flow and/or the recirculation flow of filtered oil comprise pumping means (112, 212, 312, 314) and/or a thermostat controlled valve (313) and/or a biased check valve.

14. The method of claim 1, wherein the method is applied to a set-up having a total oil volume, and wherein the volume of oil cleaned per hour is between 0.1% and 2% of the total oil volume of the set-up.

15. A method for cleaning degraded oil comprising oil soluble degradation products, comprising:
receiving an inlet flow (1, 1a, 1b) of degraded oil;
combining the inlet flow of degraded oil with a recirculation flow (6, 6a, 6b) consisting of filtered oil having a temperature below the temperature of the degraded oil, where the combining of the degraded oil and the filtered oil takes place at a recombination point (208, 308) adapted to allow the degraded oil and the filtered oil to mix and exchange heat, thereby initiating precipitation of degradation products of the degraded oil;
maintaining the mixed oil within a temperature range useful for precipitation between the recombination point (208, 308) and a filter (104, 204, 304);
passing the mixed oil having precipitated degradation products through the filter (104, 204, 304), the filter (104, 204, 304) being adapted to remove the degradation products from the mixed oil to produce a filtered oil;
dividing the filtered oil between an outlet flow (2, 2a, 2b) of filtered oil and the recirculation flow (6, 6a, 6b) of filtered oil;
discharging the outlet flow (2, 2a, 2b) of filtered oil; and
cooling the recirculation flow (6, 6a, 6b) of filtered oil to the temperature below the temperature of the degraded oil and directing the recirculation flow (6, 6a, 6b) to the recombination point (208, 308), where the cooled filtered oil mixes with, and exchanges heat with the degraded oil to bring about the precipitation of degradation products of the inlet flow (1, 1a, 1b).

16. The method of claim 15, further comprising:
pre-cooling the degraded oil prior to precipitating oil-soluble degradation products from the degraded oil by cooling the degraded oil,
wherein the temperature of the pre-cooled oil in the inlet flow is kept at a temperature where the solubility of the degradation products in the degraded oil exceeds the concentration of the degradation products present in the degraded oil.

17. The method of claim 15, wherein the method is applied to a set-up having a total oil volume, and wherein the volume of oil cleaned per hour is between 0.05% and 5% of the total oil volume of the set-up.

18. The method of claim 15, further comprising: controlling the dwell time, in response to one or more of: a level of contamination of the oil in the inlet flow, and a level of contamination of the oil in the outlet flow.

* * * * *